United States Patent
Peng

(10) Patent No.: US 6,955,391 B1
(45) Date of Patent: Oct. 18, 2005

(54) DEPLOYABLE TRIM FOR SIDE IMPACT SYSTEM IN AUTOMOBILES

(75) Inventor: Zheng James Peng, Ypsilanti, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 10/248,364

(22) Filed: Jan. 14, 2003

(51) Int. Cl.$^7$ .............................................. B60R 21/04
(52) U.S. Cl. ................................ 296/146.6; 296/146.7; 296/187.12; 280/751
(58) Field of Search .......................... 296/39.1, 146.5, 296/146.6, 146.7, 187.12; 280/748, 751

(56) References Cited

U.S. PATENT DOCUMENTS

| | | | | |
|---|---|---|---|---|
| 4,272,103 | A | * | 6/1981 | Schmid et al. ............... 280/751 |
| 5,000,509 | A | | 3/1991 | Sinnhuber et al. ..... 296/187.12 |
| 5,098,124 | A | | 3/1992 | Breed et al. ................. 280/751 |
| 5,110,176 | A | | 5/1992 | Curtis .................... 296/187.12 |
| 5,395,135 | A | * | 3/1995 | Lim et al. .................... 280/751 |
| 5,435,618 | A | | 7/1995 | Sacco et al. ........... 296/187.12 |
| 5,482,344 | A | | 1/1996 | Walker et al. .............. 296/39.1 |
| 5,542,738 | A | * | 8/1996 | Walker et al. ......... 296/187.05 |
| 5,603,548 | A | | 2/1997 | Gandhi et al. ........... 296/146.7 |
| 5,707,098 | A | * | 1/1998 | Uchida et al. ........... 296/146.6 |
| 5,716,093 | A | * | 2/1998 | Sadr ......................... 296/146.6 |
| 5,749,600 | A | * | 5/1998 | Yamada et al. ............. 280/751 |
| 6,364,398 | B1 | | 4/2002 | Kim ........................ 296/146.6 |
| 2002/0158486 | A1 | * | 10/2002 | Dauvergne et al. ...... 296/146.6 |

FOREIGN PATENT DOCUMENTS

| | | | | |
|---|---|---|---|---|
| DE | 3238901 A1 | * | 4/1984 | ................. 280/751 |
| DE | 4228626 A1 | * | 3/1994 | ............. 296/146.5 |
| JP | 04-362415 A | * | 12/1992 | ............. 296/146.6 |

* cited by examiner

*Primary Examiner*—D. Glenn Dayoan
*Assistant Examiner*—Paul Chenevert
(74) *Attorney, Agent, or Firm*—Gigette M. Bejin

(57) ABSTRACT

A deployable interior door trim for an automotive vehicle that separates in the middle section to separate the lower door trim portion from the armrest. The separating door trim permits a pelvis pusher block to engage the occupant of the vehicle during side impact situations without pushing the armrest into the abdomen region of the occupant. An alternative embodiment has the separation area formed as a line extending around a deployable portion of the door trim corresponding to the pelvis pusher block so that the pusher block can pass through the door trim to engage the occupant pelvis area. Preventing excessive abdomen rib deflections on crash dummies will improve performance ratings in IIHS side impact tests without requiring a structural change in the energy absorbing door structure of the vehicle.

6 Claims, 5 Drawing Sheets

DEPLOYABLE TRIM FOR SIDE IMPACT SYSTEM IN AUTOMOBILES

BACKGROUND OF INVENTION

1. FIELD OF THE INVENTION

This invention relates to the deployment of a side impact system in automobiles, and, more particularly, to a door trim that enhances the operation of the side impact system.

2. BACKGROUND OF THE INVENTION

The Insurance Institute for Highway Safety (IIHS) side impact proposal poses a big challenge for automobile manufacturers. The Insurance Institute for Highway Safety has tested many vehicles, ranging from small cars to large sports utility vehicles. Generally, none of these vehicles received exceptional ratings.

The problem recognized with the testing by the Insurance Institute for Highway Safety (IIHS) is a much heavier IIHS barrier (1500 kg vs 1370 kg for FMVSS214 testing procedures) crashes into vehicles at 50 kilometers per hour (kph) and the sides of vehicles are not strong enough to reduce the speed of the barrier before the vehicle interior impacts the occupants. To attain better safety performance in the IIHS testing procedure, automobile manufacturers need to effectively and cost efficiently reinforce vehicle sides or to change the crash dummy kinematics.

The Insurance Institute for Highway Safety side impact testing is a new proposal. Currently few mechanisms have been developed specifically for these testing procedures. Traditional side impact development concentrates on reinforcement of vehicle B-Pillar, rocker, door beam, floor pan, etc. These reinforcement mechanisms might have provided some benefits on previous side impact testing procedures but will have limited effect on IIHS side impact testing due to the fact that IIHS side impact barrier is much larger, e.g. 200 mm bigger vertically than previously used impact barriers, is positioned much higher, e.g. 100 mm higher from the ground than the position of the previously used impact barrier, and is significantly heavier than the previously used impact barrier. Cost and weight increase are some of the other issues in the reinforcement design.

One perceived problem is that severe intrusion by the impact barrier will overwhelm any small design changes, even for large floor pan reinforcement, which can be very costly in application. The floor pan has to go through the floor tunnel where the curved shape will make the reinforcement weaker. Therefore, some other mechanism will be needed in order to put significant impediment forces on the impact barrier to reduce the speed and dynamic crush of the impact barrier, and at the same time change the crash dummy kinematics, such as, for example, pushing the crash dummy from the pelvis area. Studies show that changing dummy kinematics is more effective than reducing general intrusion from the impact barrier because of the large crash zone for vehicle side impacts.

In an IIHS side impact event, the thorax region of the crash dummy is pushed further inboard than the pelvis area of the crash dummy under conventional vehicle door structure, thereby causing the lower spine of the crash dummy to bend. The upper body of the crash dummy drags the lower body to move inboard. Since the lower body represents a large portion of the crash dummy weight, the thorax and abdomen rib regions are under severe pressure to deform. Most vehicles are rated poorly on the IIHS side impact tests because of excessive rib deflections.

Pelvis pusher blocks are widely used to push the pelvis region of the crash dummy further inboard to release the pressure in the thorax and abdomen areas. The pelvis pusher block is typically made from soft foam, i.e. foams of 25 or 30 psi. One problem with the use of pelvis pusher blocks is that the pelvis pusher block has to push through interior door trim. Since the armrest is close to the pelvis area, the inwardly moving door trim will cause the armrest to move inboard and, therefore, the abdomen ribs of the crash dummy are under severe pressure to deform.

Prior art door structures have been developed to resist side impact forces. In U.S. Pat. No. 5,000,509, issued to Sinnhuber et al. on Mar. 19, 1991, the side impact is absorbed by the door structure through low deformation sections and braces. In U.S. Pat. No. 5,098,124, issued to Breed et al. on Mar. 24, 1992, impact energy absorbing members extend to the bottom of the door to cushion the occupant from side impacts. In U.S. Pat. No. 5,110,176, issued to Curtis on May 5, 1992, side impact forces are absorbed by a cantilever brace attached to the vehicle floor. In U.S. Pat. No. 5,435,618, issued to Sacco et al. on Jul. 25, 1995, a welded structure of plates and transverse members transfers energy to the sills. In U.S. Pat. No. 6,364,398, issued to Kim on Apr. 2, 2002, a pusher is attached to a door reinforcing member to force the door trim and the passenger inwardly upon side impacts.

In addition to side impact absorbing structure, other patents have been granted to door trim features that deploy on side impact to facilitate the absorption of the side impact forces. As an example, U.S. Pat. No. 5,482,344, issued to Walker et al on Jan. 9, 1996 teaches a door trim panel that is releasably attached at the bottom portion thereof to release from the occupant compartment to allow the energy absorbing member to enter into the occupant compartment in a substantially undeformed state. In U.S. Pat. No. 5,603,548, issued to Gandhi et al. on Feb. 18, 1997, internal pushers extending between a target member and the bottom of the inner door trim to push the bottom of the inner door trim into engagement with the seat structure upon encountering a side impact.

It would be desirable to provide a door trim structure that would enhance the use of pelvis pusher blocks to protect the occupants of the vehicle during side impacts.

SUMMARY OF INVENTION

It is an object of this invention to provide a deployable interior door trim for use to enhance performance of side impact absorbing door structure.

It is another object of this invention to provide deployable interior door trim that would separate to facilitate the use of pelvis pusher blocks as side impact absorbing structure in automobile doors.

It is a feature of this invention that the armrest is separated from the lower door trim to prevent the movement of the pelvis pusher blocks from moving the armrest into engagement with the occupant.

It is an advantage of this invention that the performance of the side impact energy absorbing door structure is enhanced.

It is still another object of this invention to increase the performance ratings of automobiles undergoing IIHS side impact testing.

It is another feature of this invention to reduce rib deflections on crash dummies during side impact testing of automobiles.

It is another advantage of this invention that performance ratings of automobiles subjected to IIHS side impact testing are increased.

It is another advantage of this invention that the improvement in performance ratings during side impact testing can be obtained in a cost effective manner.

It is yet another feature of this invention that the performance ratings of vehicles undergoing side impact testing can be improved without changing the structure of the energy absorbing door.

It is a further object of this invention to provide a side impact energy absorbing system that is durable in construction, inexpensive of manufacture, carefree of maintenance, facile in assemblage, and simple and effective in use.

These and other objects, features and advantages are accomplished according to the instant invention by providing a deployable interior door trim for an automotive vehicle that separates in the middle section to separate the lower door trim portion from the armrest. The separating door trim permits a pelvis pusher block to engage the occupant of the vehicle during side impact situations without pushing the armrest into the abdomen region of the occupant. An alternative embodiment has the separation area formed as a line extending around a deployable portion of the door trim corresponding to the pelvis pusher block so that the pusher block can pass through the door trim to engage the occupant pelvis area. Preventing excessive abdomen rib deflections on crash dummies will improve performance ratings in IIHS side impact tests without requiring a structural change in the energy absorbing door structure of the vehicle.

BRIEF DESCRIPTION OF DRAWINGS

The advantages of this invention will become apparent upon consideration of the following detailed disclosure of the invention, especially when taken in conjunction with the accompanying drawings wherein.

DETAILED DESCRIPTION

Figure 1:
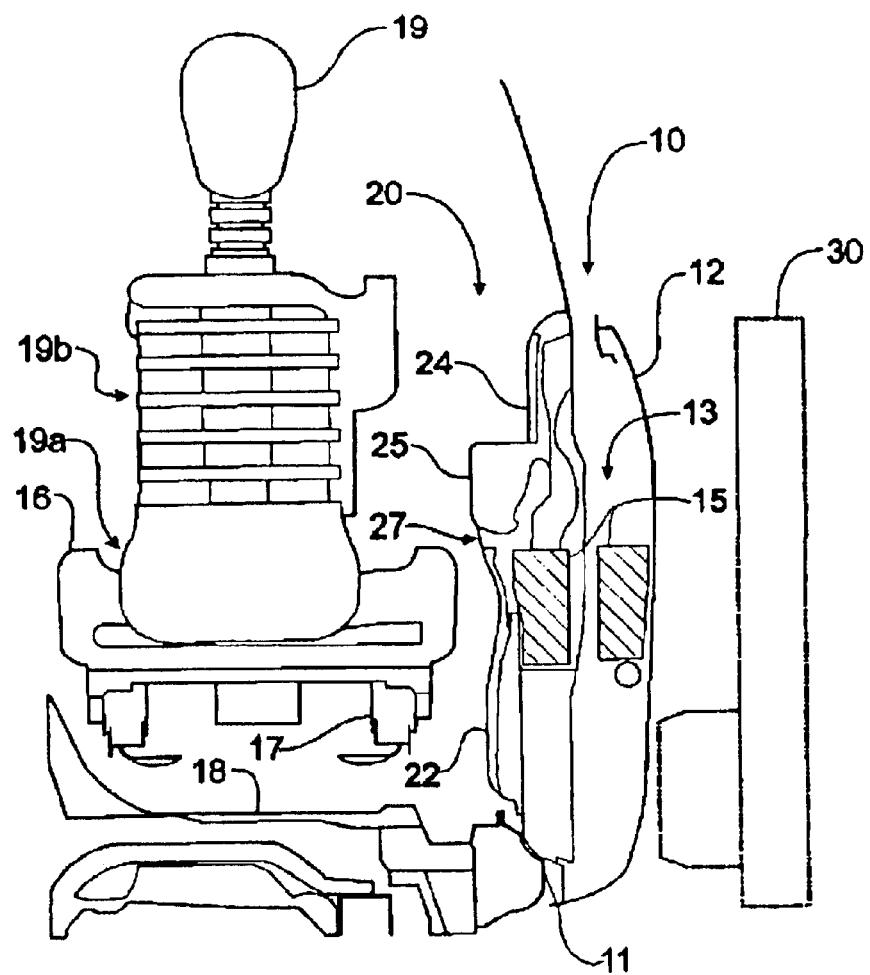
FIG. 1 is a schematic partial cross-sectional view taken through a front side door of an automobile depicting the interior energy absorbing structure of the door in relation to a crash dummy seated on the automobile seat adjacent the door, the impact barrier being depicted in phantom lines adjacent the door prior to impact therewith.
Figure 3:
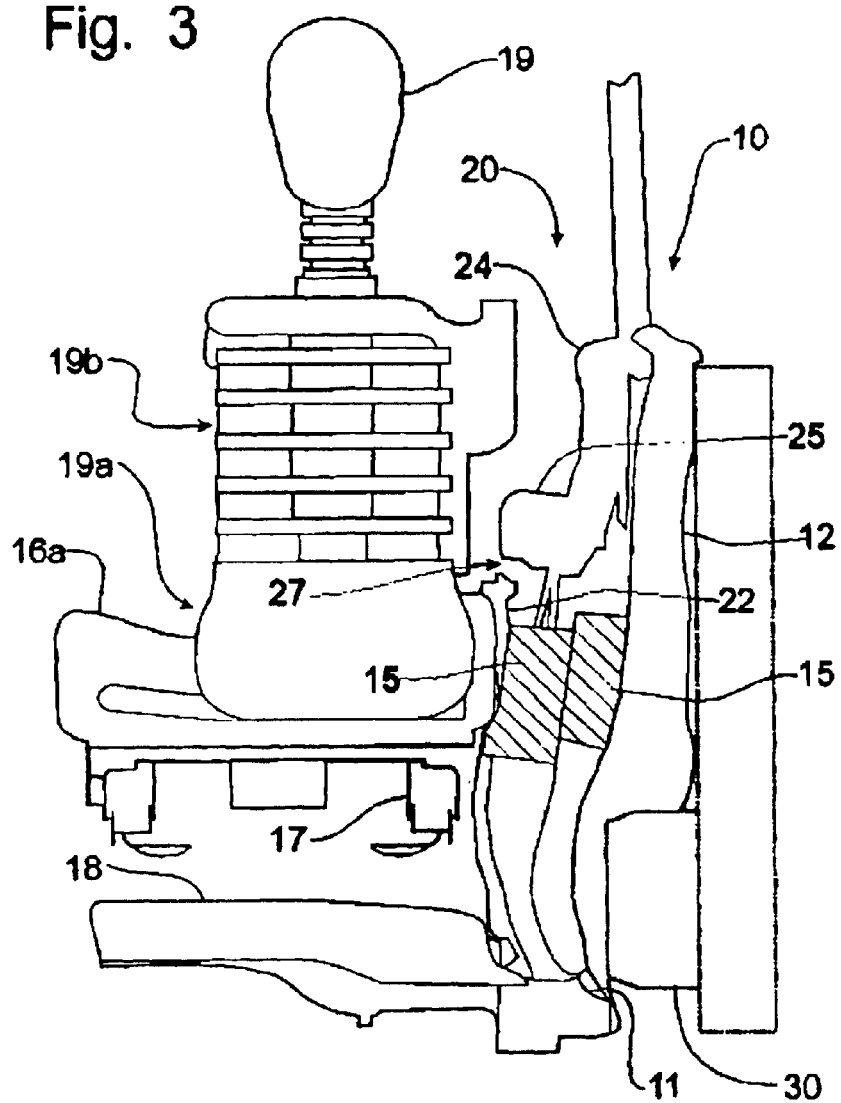
FIG. 3 is a schematic partial cross-section view of a rear side door structure with the impact barrier engaged into the door as depicted in FIG. 2.

Referring to FIGS. 1 3, an energy absorbing side door structure system for an automotive vehicle incorporating the principles of the instant invention to absorb side impact forces into the vehicle can best be seen. The door structure 10 includes an outer door panel 12 and conventional braces and an energy absorbing structure 13 internally of the door. On the interior side of the door 10, the door trim 20 provides a decorative appearance to the interior of the automobile. The interior door trim 20 includes a lower portion 22 and an upper portion 24 that includes an armrest 25 positioned at a conventional and convenient location for use thereof by the occupant, represented by the crash dummy 19. Adjacent the side door 10, the crash dummy 19 sits in the front seat 16, or the back seat 16a as represented in FIG. 3, which is supported on a seat frame 17 above the floor 18 of the vehicle which terminates at the door sill 11 engagable with the door 10 in a conventional manner.

Figure 2:
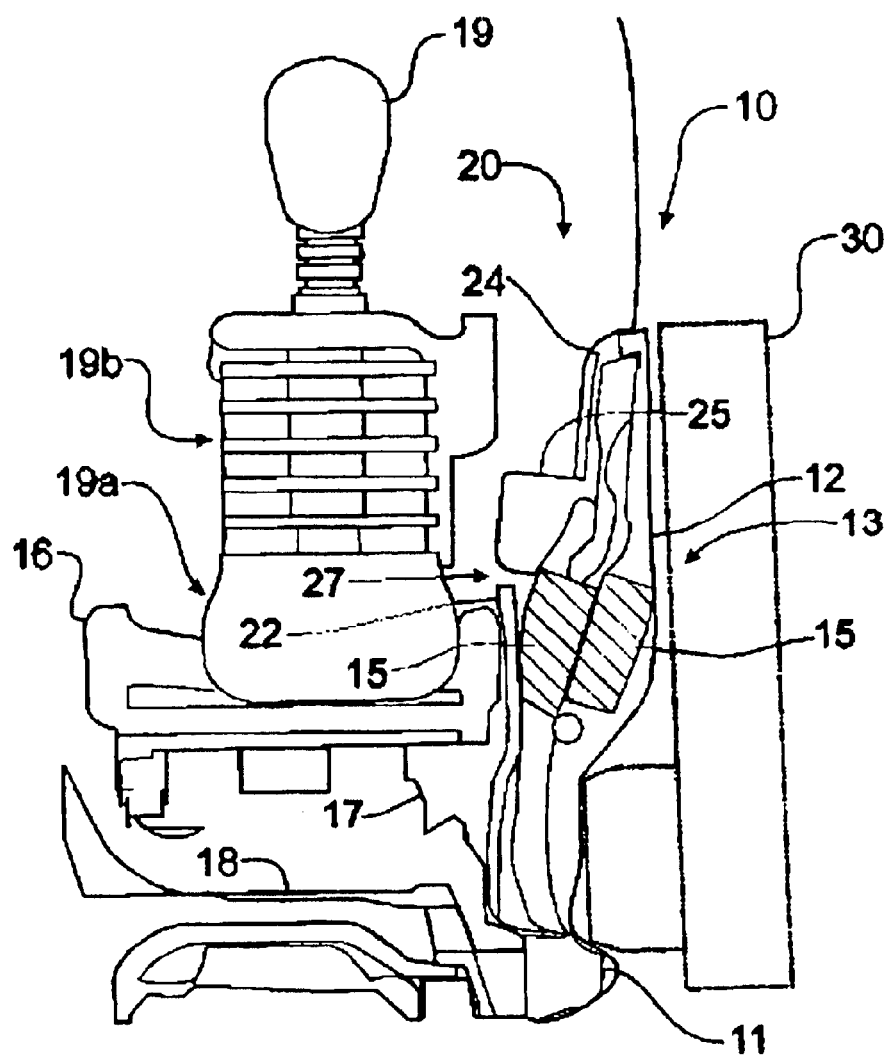
FIG. 2 is a schematic partial cross-sectional view similar to that of FIG. 1 except that the impact barrier shown in phantom lines has impacted into the side door, the energy absorbing structure is engaging the vehicle interiors, as well as the occupant pelvis area.

Internally of the door structure 10, the energy absorbing structure 13 includes pelvis pusher blocks 15 preferably constructed of foam, such as 30 psi foam. Upon impact by the impact barrier 30, depicted in phantom lines in FIGS. 1 3, the pelvis pusher blocks 15 are moved inwardly toward the crash dummy 19. In the case of both the front and rear seats, as shown respectively in FIGS. 2 and 3, the foam pelvis pusher blocks 15 move inwardly to engage the pelvis region 19a of the crash dummy 19 to move the crash dummy 19 inwardly away from the impact barrier 30.

Figure 4:
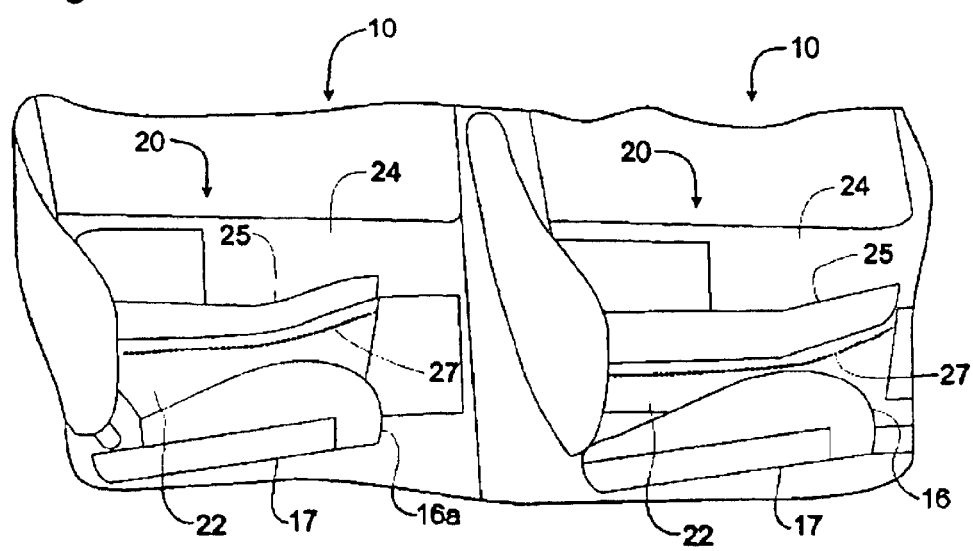
FIG. 4 is a schematic elevational view of a portion of an automobile showing the front and rear seats in relation to the deployable interior door trim incorporating the principles of the instant invention.

As depicted in FIGS. 1 4, the interior door trim 20 is formed with a weakened separation area 27 that permits the upper portion 24 to separate from the lower portion 22 when the pelvis pusher blocks 15 are moved inwardly by the intruding impact barrier 30. Since the pelvis pusher blocks 15 are moving the lower door trim 22 inwardly toward the occupant pelvis area 19a, the separation of the lower trim portion 22 from the upper trim portion 24 prevents the inward movement of the pelvis pusher blocks 15 from dragging the armrest 25 into engagement with the abdomen region 19a of the crash dummy 19. As a result, the occupant 19 on the seat 16, 16a can be moved inwardly without excessive deflections of the ribs of the thorax and abdomen or twisting of the spine. The crash dummy 19 is pushed inwardly from the pelvis area 19a by the pelvis pusher blocks 15 without dragging the armrest 25 and upper trim 24 into engagement with the crash dummy 19.

Preferably, the separation area 27 defines a line extending in the longitudinal direction of the vehicle below the armrests 25, but above the location of the pelvis pusher blocks 15. The top portion of the lower trim 22 covers the pelvis areas 19a of the crash dummy 19. When the pelvis pusher 15, which is widely used to push the pelvis region 19a of the crash dummy 19 inboardly, starts to push on the pelvis area 19a, the lower trim 22 will separate from the upper trim 24. The pelvis pusher 15 will push the dummy pelvis 19a inboard without dragging the upper trim 24 and armrest 25 inwardly with it.

As a result, the lower body 19a of the crash dummy 19 will drag the upper body 19b to move, instead of that the upper body 19b dragging the lower body 19a. The pelvis pusher blocks 15 will generally reduce the pressure on thorax 19b and abdomen areas 19a but the effectiveness is enhanced because the pelvis pusher blocks 15 do not move the armrest 25 and drag the armrest 25 into engagement with the crash dummy 19. This improvement in side impact testing results is obtained without adding additional structure to the energy absorbing door 10 and, therefore, comes without any significant weight penalty.

Figure 5:
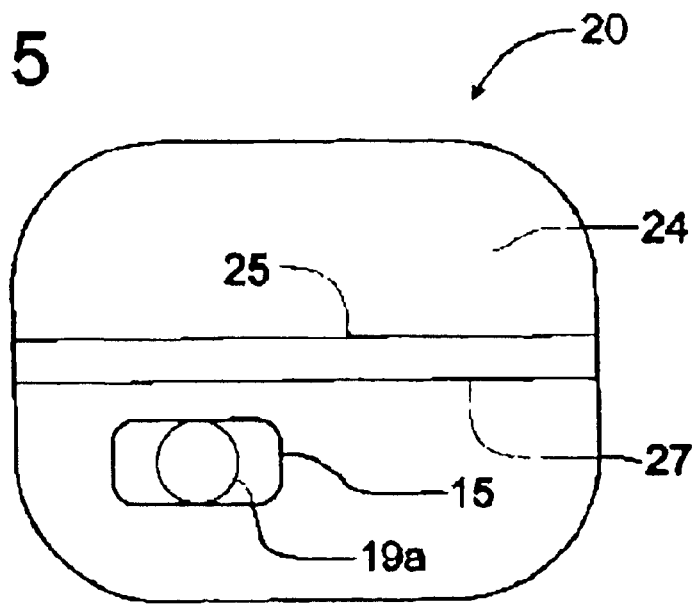
FIG. 5 is a schematic elevational view of an alternative embodiment of the instant invention in which the separation line of the interior door trim is made a theme line for the door trim.
Figure 6:
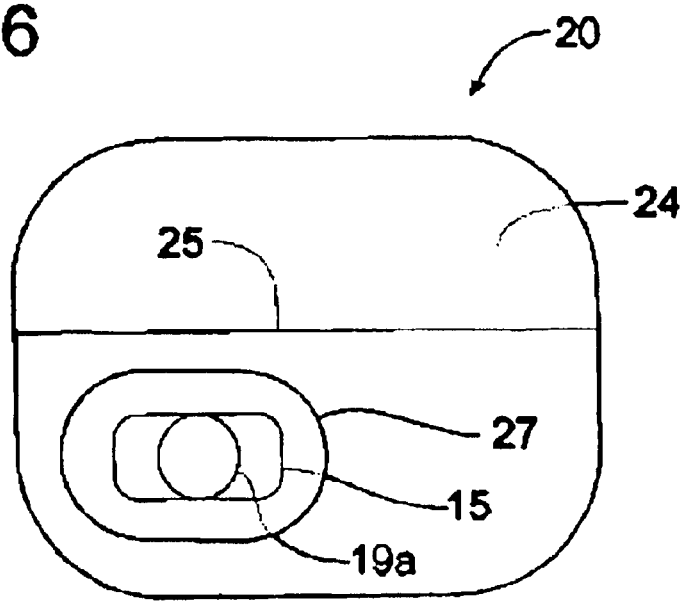
FIG. 6 is a schematic elevational view of a second alternative embodiment of the instant invention in which the separation line of the interior door trim encircles the pelvis pusher block area to permit the engagement of the pelvis pusher block with the interior of the occupant compartment without effecting movement of the associated armrest.

Alternatively, as is represented in FIG. 5, the separation line 27 can be extended entirely across the longitudinal length of the door 10 so as to permit the separation line 27 to be incorporated into a theme line or decorative theme of the interior door trim 20 so as to be essentially invisible to the occupant. As a further alternative depicted in FIG. 6, the separation line 27 in the interior door trim 20 can be extended around the pelvis pusher block 15 to permit the entrance of the pelvis pusher blocks 15 through the door trim 20 without dragging the armrest 25 or the rest of the upper or lower door trim 24, 22 into engagement with the occupant 19. The shape formed by such a separation line 27 can be in substantially any form to enable the separation line 27 to be incorporated into the theme of the door trim 20.

The conclusion from data expressed on computer-aided engineering simulations for a typical vehicle is that the deployable trim system reduces the abdomen rib deflections substantially in rear seat 16a, up to about 27%. The effectiveness for thorax ribs is limited for both front and rear crash dummies on the seats 16, 16a, up to about 11% improvement, because the separation line is too far away from the thorax area. The effectiveness for the abdomen rib deflections on the crash dummy 19 on the front seat 16 is more limited, an improvement of up to 3%, because the front door armrest 25 is bulky and is located right in front of the impact barrier 30. The front door armrest 25 tends to bottom out on the door inner structural members. The dragging effect is small.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

What is claimed is:

1. In an automobile having an occupant compartment including a seat; and a door adjacent said seat and including an outer door panel, interior door trim having an upper portion including an armrest and a lower portion, and a side impact system including an energy absorbing mechanism housed between the outer member and said interior door trim to absorb energy from an external side impact into said outer door panel, the improvement comprising:

said interior door trim being formed with a separation area to permit said energy absorbing mechanism to push toward said occupant compartment by said external side impact such that said upper portion is not moved inwardly with said energy absorbing mechanism, said separation area being defined by a separation line extending along said vehicle door below said armrest between said upper portion and said lower portion to permit said lower portion to physically separate from said upper portion substantially completely along said separation line so that all of said lower portion below said armrest can move inwardly with said energy absorbing mechanism into engagement with said seat without moving said upper portion toward said seat.

2. The automobile of claim 1 wherein said energy absorbing mechanism includes a pelvis pusher block operable upon engagement with said external impact to break through said interior door trim to push an occupant oriented on said seat inwardly away from said door.

3. An energy absorbing vehicle door comprising:
an outer door panel;
an interior door trim having an upper portion including an armrest and a lower portion extending in a longitudinal direction;
an energy absorbing mechanism positioned between said outer door panel and said interior door trim to absorb energy from an external side impact into said outer door panel, said energy absorbing mechanism being operable to move into engagement with said interior door trim when encountering said external side impact; and
a separation area formed in said interior door trim to permit said energy absorbing mechanism to break through said interior door trim for engagement with an occupant positioned on an adjacent vehicle seat without dragging said armrest with said energy absorbing mechanism, said separation area being defined by a separation line extending along said vehicle door substantially completely below said armrest to permit said lower portion to physically separate from said armrest completely along substantially the entire longitudinal direction of said interior trim so that said lower portion can move into engagement with said vehicle seat completely along said separation line, thus permitting a movement of any part of said lower portion toward said vehicle seat without moving said armrest inwardly with said lower portion.

4. The energy absorbing vehicle door of claim 3 wherein said energy absorbing mechanism includes a pelvis pusher block operable when encountering said external side impact to move through said interior door trim to push an occupant on said adjacent vehicle seat away from said door.

5. The energy absorbing vehicle door of claim 4 wherein said separation line divides said upper portion from said lower portion when impacted by said pelvis pusher block to deploy said lower portion against said vehicle seat with said energy absorbing mechanism and prevent said armrest from engaging said occupant.

6. A side impact system for a vehicle door wt absorb energy from a side impact into said vehicle door and protect an occupant positioned on a vehicle seat adjacent said vehicle door, comprising:

a pelvis pusher block located internally of said vehicle door to be operable to move toward said vehicle seat when said vehicle door encounters said external side impact; and a deployable trim panel affixed to an interior side of said vehicle door between said pelvis pusher block and said adjacent vehicle seat, said trim panel having a lower portion and an upper portion including an armrest, said trim panel including a separation area below said armrest to permit the passage of said pelvis pusher block toward said vehicle seat through said trim panel without dragging said arm rest inwardly with said pelvis pusher block, said separation area being formed by a separation line extending along said vehicle door below said armrest to permit all of said lower portion to physically separate from said armrest so that said lower portion can move into engagement with said vehicle seat without moving said armrest inwardly with said lower portion, said separation line dividing said upper portion from said lower portion when impacted by said pelvis pusher block to deploy said lower portion against said vehicle seat which said energy absorbing mechanism so that said lower portion will not be connected to said upper portion and said armrest, whereby said armrest is not moved inwardly through connection to said lower portion, thus preventing said armrest from engaging said occupant.

* * * * *